(12) United States Patent
Oh

(10) Patent No.: US 6,255,856 B1
(45) Date of Patent: Jul. 3, 2001

(54) COMPARATOR

(75) Inventor: Kun-Chang Oh, Seoul (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 0 days.

(21) Appl. No.: 09/382,785

(22) Filed: Aug. 25, 1999

(30) Foreign Application Priority Data

Sep. 11, 1998 (KR) .................................. 98/37575

(51) Int. Cl.[7] ........................ H03K 19/20; H03K 19/094
(52) U.S. Cl. ........................ 326/113; 326/112; 326/119; 340/146.2
(58) Field of Search .................... 326/112, 119, 326/121, 122, 113; 327/65, 563; 340/146.2

(56) References Cited

U.S. PATENT DOCUMENTS

| 4,032,885 | * | 6/1977 | Roth | 340/146.2 |
|---|---|---|---|---|
| 5,281,946 | * | 1/1994 | Van Le | 340/146.2 |
| 5,450,056 | * | 9/1995 | Jens | 340/146.2 |
| 5,742,224 | * | 4/1998 | Gadducci et al. | 340/146.2 |
| 5,986,538 | * | 11/1999 | Yoon | 340/146.2 |
| 6,014,074 | * | 1/2000 | Park | 340/146.2 |
| 6,114,945 | * | 9/2000 | Houston | 340/146.2 |

* cited by examiner

*Primary Examiner*—Patrick Wamsley
*Assistant Examiner*—Steven S. Paik

(57) ABSTRACT

A comparator which improves a comparing speed and has a simple logic circuit compared to the conventional adder or subtracter includes: a plurality of pre-comparing units for comparing two inputs A, B by dividing each of the inputs by 4 bits; a selection logic unit for receiving an equality signal among signals from the pre-comparing units and outputting a selection enable signal; a plurality of pass logic units enabled by the selection enable signal of the selection logic unit and outputting outputs of the pre-comparing units and the input A; and a post-comparing unit for receiving and comparing a 4-bit output of the pre-comparing units which is outputted through the enabled pass logic units and the input A.

13 Claims, 5 Drawing Sheets

COMPARATOR

BACKGROUND OF THE INVENTION

1. Field of the Invention

The present invention relates to a comparator, and more particularly to a comparator which has a simple logic circuit compared to a conventional adder or subtracter.

2. Description of the Conventional Art

A comparator for judging an input in relation to another input is divided into two types, a sequential comparator and a bit comparator. FIG. 1 is a schematic block diagram which shows an example of the sequential comparator. As shown therein, the comparator obtains complements of addends B0–B3, respectively, by a complementer 1 and using adders 2a–2d sequentially adds bit by bit the complements to corresponding augends A0–A3 from a highest bit to a lowest bit of the augends A0–A3, thereby judging sizes of the two inputs A0–A3, B0–B3 in accordance with a fact whether a carry is generated in the last adder 2d.

That is, when the first comparison is made for the higest bits, the larger bit is outputted, but if the compared bit are identical, a next comparison is made with respect to the lower bit.

For example, when adding A and B each of which is 4 bits, if there is generated a carry by performing the addition of corresponding bits from lowest bit, the carry is transferred to upper bits. While, when judging the sizes of A and B, a complement of one of A and B is first obtained, and then the addition is carried out from the highest bit, thereby determining whether or not a carry is generated. That is, if the carry is generated in the highest bit, the face whether there is generated the carry in the lower bit does not have any affect, and if the highest bit is zero, no carry is generated regardless of an addition result of the lower bit. Other than that, the generation of the carry in the low-order bit affects a CMP result.

FIG. 2 is a schematic block diagram illustrating an example of the bit comparator. As shown therein, in accordance with inputted bits of two numbers each of bit comparing units 1a–1d compares the bits of the two numbers, thereby generating LT (less than), GT (greater than), EQ (equal) signals, and a random logic unit 2 combines signals outputted from each bit comparing unit 1a–1d and thus lastly judges sizes of the signals.

FIG. 3 is a circuit diagram illustrating an example of a high-speed bit comparator which has a similar type to FIG. 2. The high-speed bit comparator includes a complementing unit 1 which consists of inverters 10–14 for comparing inputs A, B each of which is 5 bits and outputs a complement B' of the input B; a NAND logic unit 2 and a NOR logic unit 3 which obtain NAND outputs and NOR outputs, respectively, of the input A and the complement B'; a comparing unit 4 consisting of MOS transistors $(TP_i, TN_i)$ which are switched in accordance with output signals of the NAND and NOR logic units 2, 3 and sequentially comparing value sizes from the highest bit.

In the thusly configured comparator, if a highest bit A4 of the input A is greater than a highest bit B4 of the input B (A4=1, B4=0), an output Y4 of the NAND logic unit 2 becomes '0' and an output Z4 of the NOR logic unit 3 also becomes '0'.

Accordingly, the PMOS transistor TP(4.4) of the comparing unit 4 is turned on and NMOS transistor TN(4.4) is turned off, and a connecting point thereof becomes a level equivalent to a source voltage level VDD, thus a judging result CMP becomes '1', meaning that the input A is greater than the input B.

On the contrary, if the input B is greater than the input A (A4=0, B4=1), the output Y4 of the NAND logic unit 2 becomes '1' and the output Z4 also becomes '1'. Therefore, the PMOS transistor TP(4.4) of the comparing unit 4 is turned off and the NMOS transistor TN(4.4) is turned off, so that the connecting point thereof the result CMP becomes '0' and thus it is determined that the input A is smaller than the input B.

While, when the inputs A and B are identical, the output Y4 of the NAND logic unit 2 becomes '1', while the output Z4 of the NOR logic unit 3 becomes '0'.

Therefore, the PMOS transistor TP(4.4) and the NMOS transistor TM(4.4) are all turned off, thus no output with respect to the judging result CMP and at this time next lower bits are to be sequentially compared.

The result CMP can be expressed as an equation (1) which is a Boole's inequality.

$$CMP = Y4' + Z4'Y3' + Z4'Z3'Y2' + Z4'Z3'Z2'Y1'Z4'Z3'Z2'Z1'Y0' \quad (1)$$

Wherein, Y4' is an inversion signal of Y4, and when CMP=1, it is determined that A>B.

However, in the conventional art, if only the lowest bits of the two inputs are different, all the upper bits thereof have be compared and accordingly it takes a long time until a resultant value is outputted. Thus, a logic level to the sequential comparator decreases, but a switching time increases due to the use of a multiple input gate such as the random logic unit. Also, when there are large numbers of bits for the two inputs, the number of the PMOS and NMOS transistors which constitute the comparing unit is accordingly increased, thereby increasing the size of the comparator, which results in the reduction in an operational speed thereof.

SUMMARY OF THE INVENTION

Accordingly, the present invention is directed to a comparator which obviates the problems and disadvantages due to the conventional art.

An object of the present invention is to provide a comparator which improves a comparing speed and has a simple logic circuit compared to the conventional adder or subtracter, by first comparing two inputs by each 4-bit unit and then selecting one block which affects the comparison result for thereby comparing the two inputs.

To achieve these and other advantages and in accordance with the purpose of the present invention, as embodied and broadly described, there is provided a comparator which includes: a plurality of pre-comparing units for comparing two inputs A, B by dividing each of the inputs by 4 bits; a selection logic unit for receiving an equality signal among signals from the pre-comparing units and outputting a selection enable signal; a plurality of pass logic units enabled by the selection enable signal of the selection logic unit and outputting outputs of the pre-comparing units and the input A; and a post-comparing unit for receiving and comparing a 4-bit output of the pre-comparing units which is outputted through the enabled pass logic units and the input A.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
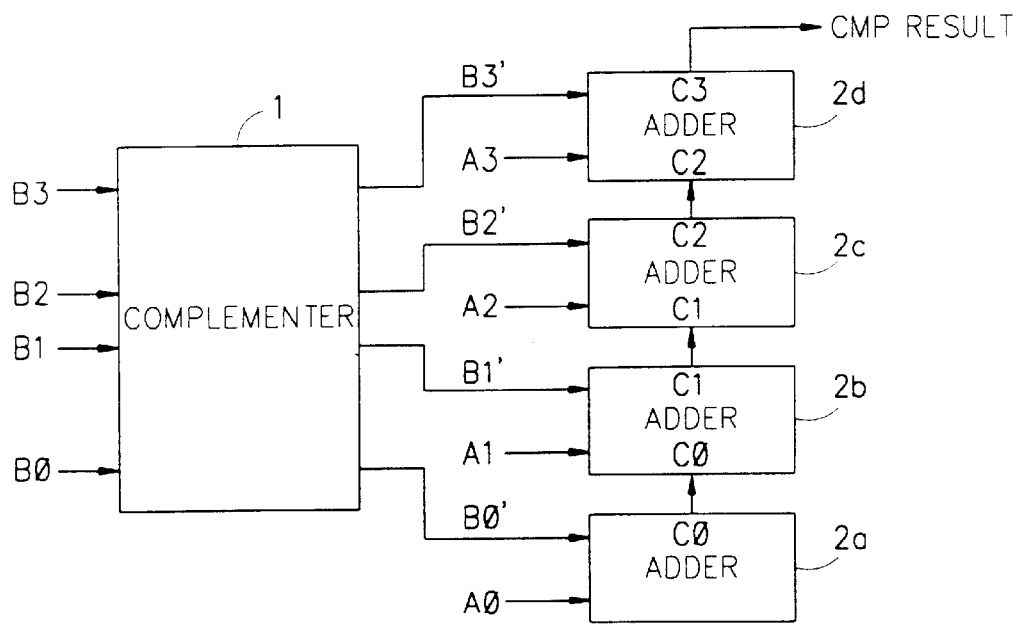
FIG. 1 is a schematic block diagram illustrating an example of a conventional sequential comparator.
Figure 2:
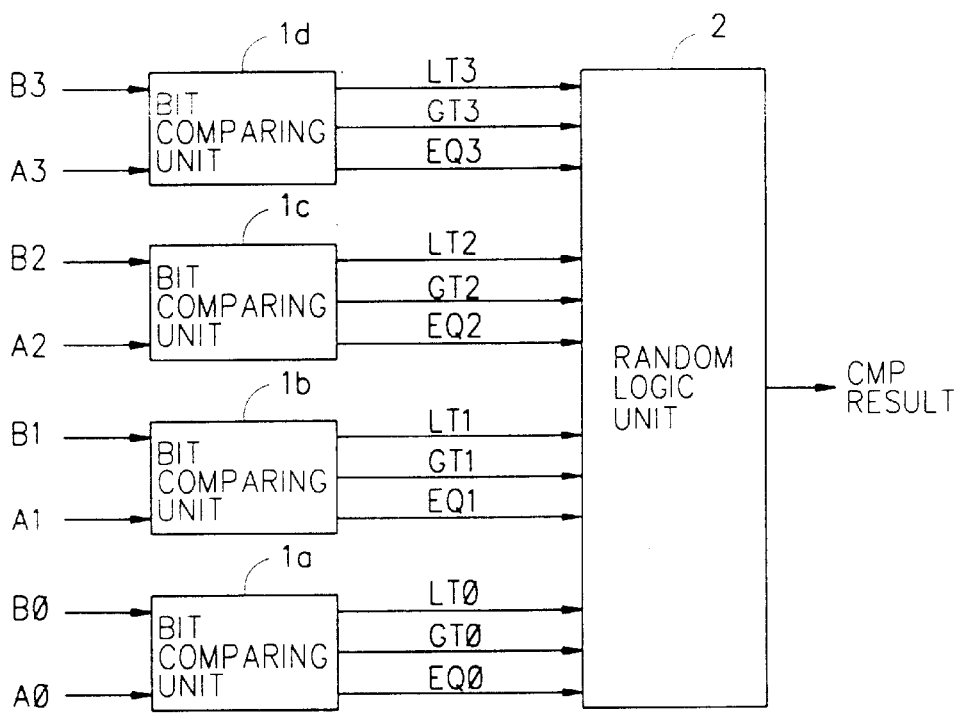
FIG. 2 is a schematic block diagram illustrating an example of a conventional bit comparator.
Figure 3:
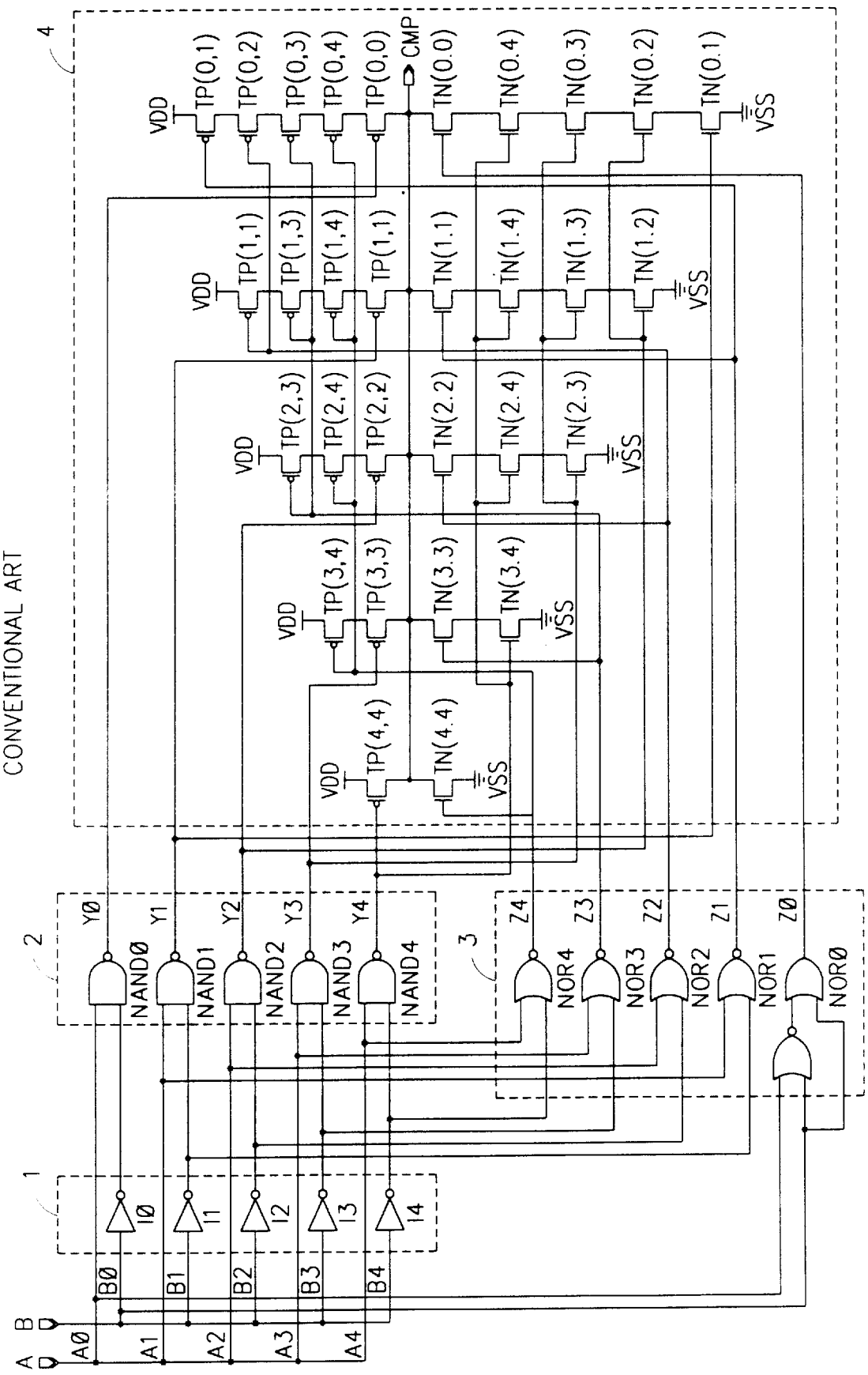
FIG. 3 is a circuit diagram illustrating an example of a conventional high-speed bit comparator which is the same type of FIG. 2.
Figure 4:
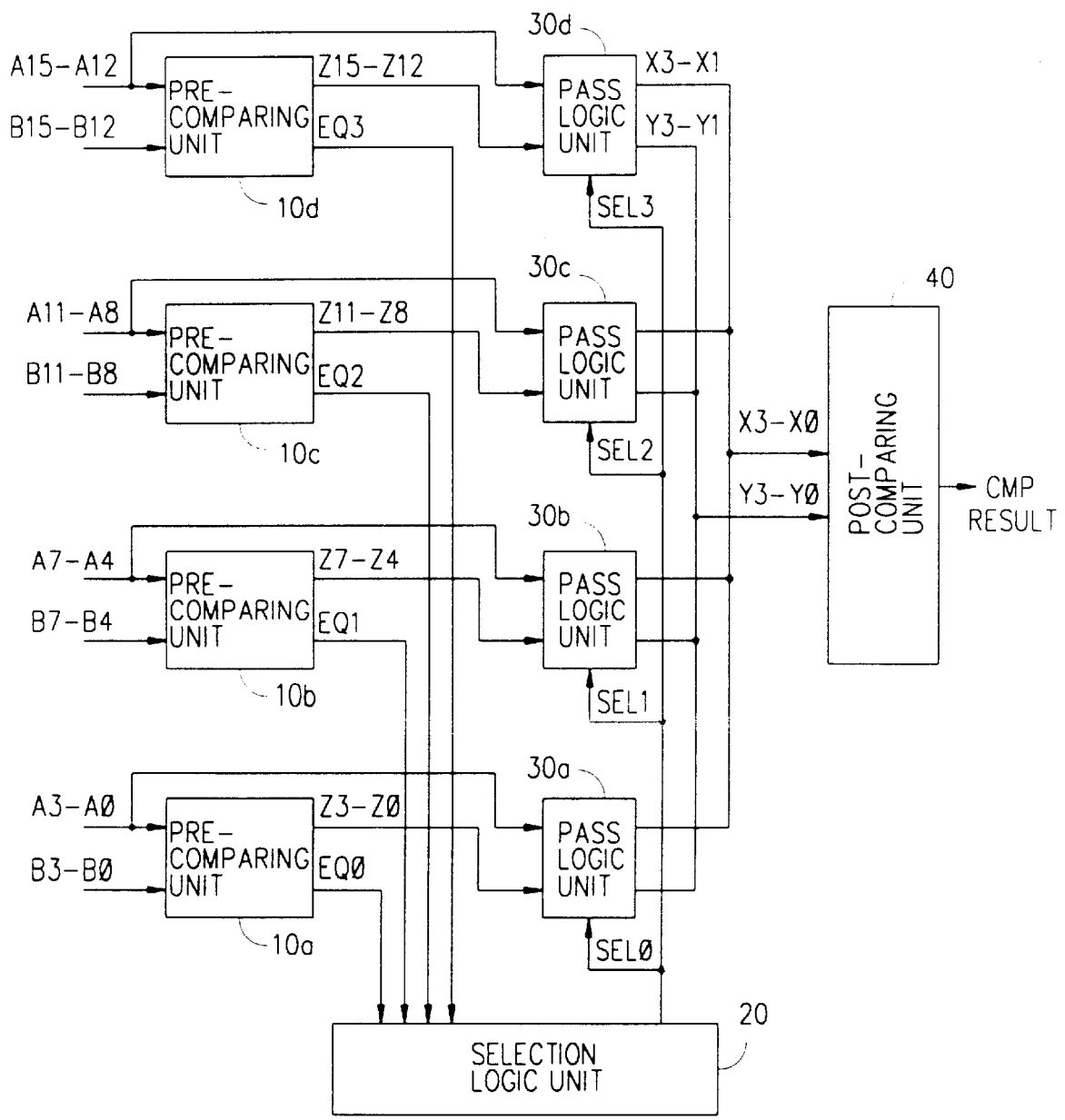
FIG. 4 is a schematic block diagram of a comparator according to the present invention.

FIG. 4 schematically illustrates a configuration of a comparator according to the present invention. As shown therein, the comparator of the present invention includes: a plurality of pre-comparing units $10a$–$10d$ comparing two inputs A, B, 4 bits of each input being applied to the corresponding unit; a selection logic unit 20 receiving equality signals $EQ_i$ among signals outputted from the pre-comparing units $10a$–$10d$ and thereby outputting a selection enable signal $SEL_i$; a plurality of pass logic units $30a$–$30d$, enabled by the selection enable signal $SEL_i$, outputting outputs of the pre-comparing unit $10a$–$10d$ and the input A; and a post-comparing unit 40 comparing the input A with a 4-bit output of the pre-comparing units $10a$–$10d$ which is outputted through the enabled pass logic units $30a$–$30d$.

Figure 5:
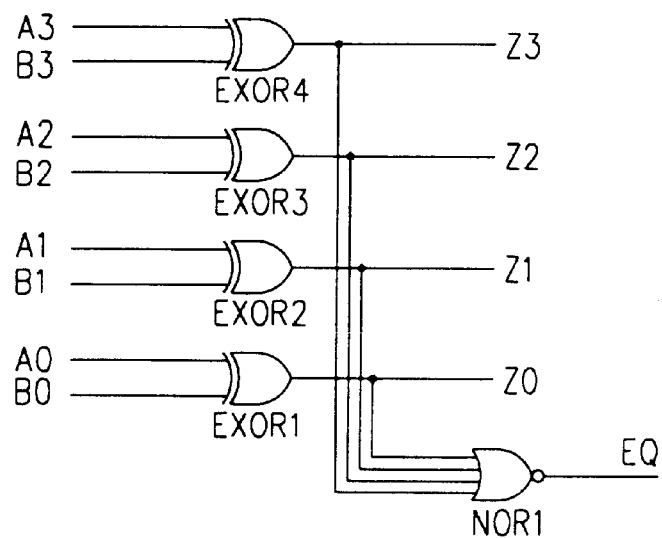
FIG. 5 is a circuit diagram of a pre-comparing unit in the comparator of FIG. 4.

More specifically, FIG. 5 illustrates the pre-comparing unit 10 of the comparator according to the present invention in a circuit diagram form, wherein exclusive OR gates EXOR1–EXOR4 respectively perform exclusive-ORing of the inputs A, B bit by bit and a NOR gate NOR1 which NORs output signals Z0–Z3 of the exclusive OR gates EXOR1–EXOR4 for thereby outputting the equality signal EQ.

Figure 6:
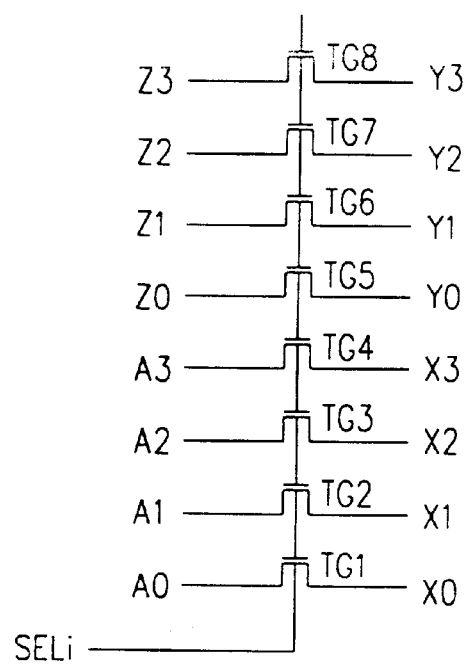
FIG. 6 is circuit diagram of a pass logic unit in the comparator of FIG. 4.

FIG. 6 more detailedly illustrates the pass logic unit 30 of the comparator of the present invention shown in FIG. 4. As shown therein, the pass logic unit consists of a plurality of transmission gates TG1–TG8 for outputting comparison signals Y0–Y3 which are enabled by the selection enable signal SEL and outputted from the pre-comparing unit 10 and input signals X0–X3 of the input A.

Figure 7:
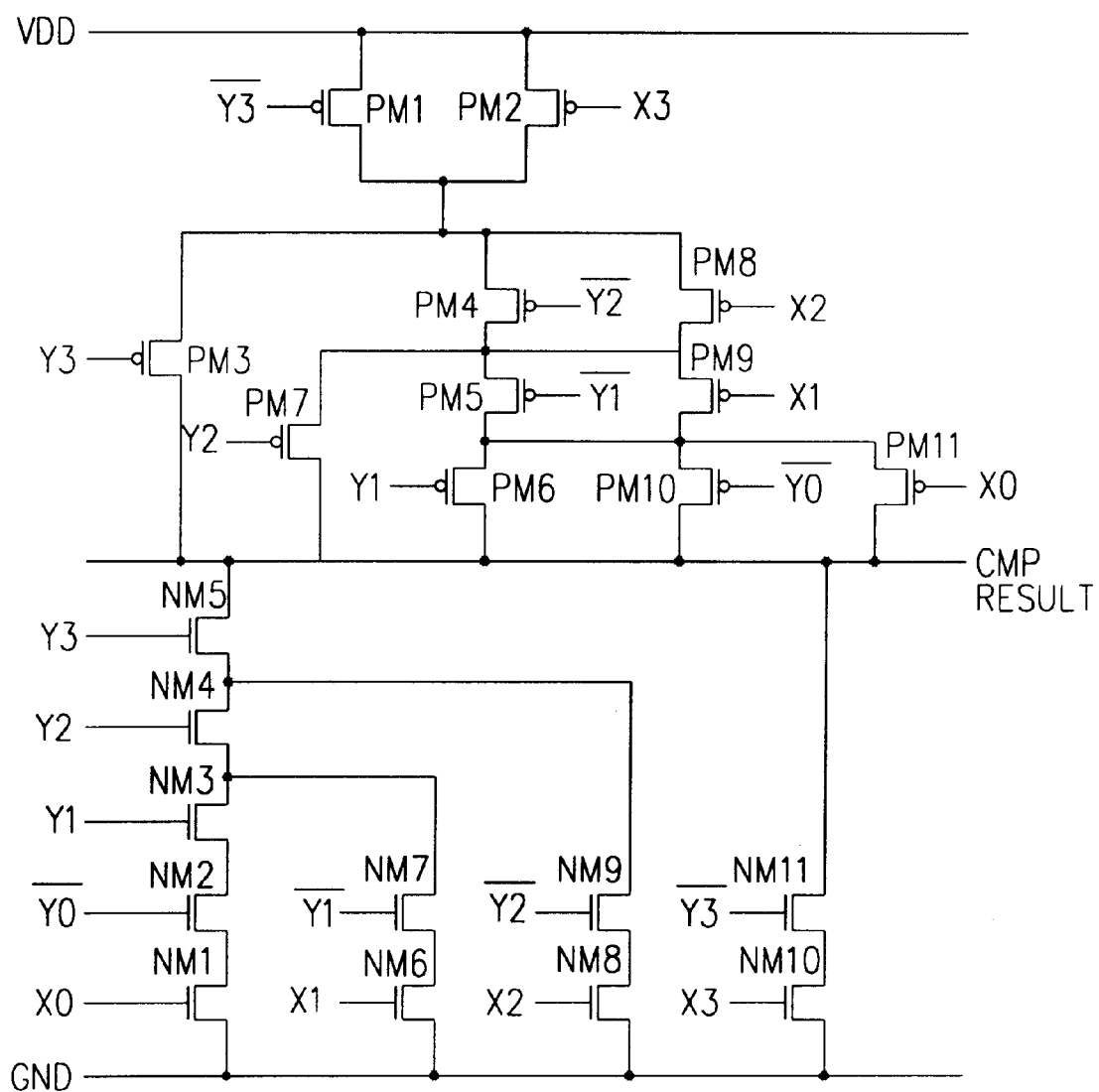
FIG. 7 is a circuit diagram of a post-comparing unit in the comparator of FIG. 4.

Further, FIG. 7 more detailedly illustrates the post-comparing unit 40 of the comparator according to the present invention shown in FIG. 4, which consists of first and second PMOS transistors PM1, PM2 having sources for commonly receiving a power source VDD, gates for receiving a comparison signal/Y3 and the input signal X3, respectively, and a common drain; a third PMOS transistor PM3 having a source connected to the common drain of the first and second PMOS transistors PM1, PM2 and a gate for receiving a comparison signal Y3; fourth, fifth and sixth PMOS transistors PM4, PM5, PM6 serially connected to the drain of the first and second PMOS transistors PM1, PM2 and having gates for receiving comparison signals /Y2, /Y1, Y1, respectively; a seventh PMOS transistor PM7 having a source connected to a common connecting point of the fourth and fifth PMOS transistors PM4, PM5 and a gate for receiving a comparison signal Y2; eighth, ninth and tenth PMOS transistors PM8, PM9, PM10 serially connected to the drain of the first and second PMOS transistors PM1, PM2 and having gates for receiving input signals X2, X1 and a comparison signal /Y0, respectively; an eleventh PMOS transistor PM11 having a source connected to a common connecting point of the fifth and sixth PMOS transistors PM5, PM6 and a common connecting point of the ninth and tenth PMOS transistors PM9, PM10 and a gate for receiving the input signal X0; second to fifth NMOS transistors NM2–NM5 serially connected to a first NMOS transistor NM1 having a gate for receiving the input signal X0 and a source connected to a ground GND and having gates for receiving comparison signals /Y0, Y1–Y3, respectively; a seventh NMOS transistor NM7 serially connected to a sixth NMOS transistor NM6 having a gate for receiving the input signal X1 and a source connected to the ground GND and having a gate for receiving the comparison signal /Y1 and a drain connected to a common connecting point of the third and fourth NMOS transistors NM3, NM4; a ninth NMOS transistor NM9 serially connected to an eighth NMOS transistor NM8 having a gate for receiving the input signal X2 and a source connected to the ground GND and having a gate for receiving the comparison signal /Y2 and a drain connected a common connecting point of the fourth and fifth NMOS transistors NM4, NM5; and an eleventh NMOS transistor NM11 serially connected to a tenth NMOS transistor having a gate for receiving the input signal X3 and a source connected to the ground GND and having a gate for receiving a comparison signal /Y3 and a drain commonly connected to a drain of the fifth NMOS transistor NM5 and drains of the PMOS transistors PM3, PM6, PM7, PM10, PM11, for thereby outputting a final comparison signal (the CMP result).

In the thusly configured comparator according to the preferred embodiment of the present invention, for example, when comparing two inputs each of which has 4 bits (A=1010, B=1100), the pre-comparing unit 10 receives and exclusively ORs the two inputs, so that output signals Z3–Z0 become '0110' and thus the comparison starts therefrom. Here, since which the output signal Z3 of a highest bit is '0' means that the two bits A3, B3 are identical, it is impossible to perform the comparison and thus a next comparison is made for next lower bits A2, B2.

Accordingly, a value of the pre-comparing signal Z2 of the lower bits A2, B2 is '1', which means that the compared two bits A2, B2 are different, thus arbitrarily selecting one of the two bits A2, B2, for thereby determining whether the value thereof is '1' or '0'. That is, when selecting A2, a value thereof is '0', it is possible to analogize that a value of B2 is '1'. Thus, it is unnecessary to compare a lower value of a bit 1 or 0. If the value of the pre-comparing signal Z2 is not '1', but '0', the comparison is continuously made, thereby obtaining the same result as above already described.

Equation (2) expresses the comparison of the pre-comparing signal Z3–Z0 and one (A) of the two 4-bit inputs A, B as a boolean algebra.

Here, if the two inputs are passed through a pass comparison unit, the pre-comparing signal Z3–Z0 becomes Y3–Y0 and A3–A0 becomes X3–X0.

$$CMP = /Y3 \cdot X3 + Y3 \cdot /Y2 \cdot X2 + \quad (2)$$
$$Y3 \cdot Y2 \cdot /Y1 \cdot X1 + Y3 \cdot Y2 \cdot Y1 \cdot /Y0 \cdot X0$$

Wherein, if CMP is '1', it means that A>B.

Next, when each of the two inputs is 16 bits (A=1001 1010 0010 0100, B=1001, 1010, 0111, 0000), for example, the pre-comparing unit 10 receives and exclusively ORs the two inputs and thus the pre-comparing signal Z15–Z0 becomes '0000 0000 0101 0100' and the equality signals EQ3–EQ0 outputted from the pre-comparing units 10d–10a, respectively, become b '1100'.

Here, which the equality signals EQ of the pre-comparing units 10d, 10c are respectively '1' means that the bits A15–A8 are identical to the bits B15–B8, so that the comparison of the bits A15–A8 and the bits B15–B8 is not necessary.

Further, if the equality signals EQ of the next compared pre-comparing units 10b, 10a are '0', it means that the bits A7–A0 and the bits B7–B0 are different. Thus, the two inputs A, B can be compared if only upper 4 bits (A7–A4, B7–B4) of the 8 bits are compared.

Accordingly, the selection logic unit 20 receives the equality signals EQ3–EQ0 outputted from the pre-comparing units 10d–10a and outputs the selection enable signal SEL to the pass logic unit 30b which receives upper bits A7–A4, B7–B4 of the pre-comparing units 10b, 10a wherein the equality signals EQ is '0', thus supplying pre-comparing signals Z7–Z4 and the bits A7–A4 to the post-comparing unit 40.

As described above, Equation (3) expresses the process for receiving the equality signals EQ3–EQ0 and outputting the selection enable signal SEL1 to the pass logic unit 30b which receives effective 4 bits among the plurality of pass logic units 30.

$$SEL3 = /EQ3 \quad (3)$$
$$SEL2 = EQ3 \cdot /EQ2$$
$$SEL1 = EQ3 \cdot EQ2 \cdot /EQ1$$
$$SEL0 = EQ3 \cdot EQ2 \cdot EQ1$$

As described above, the comparator of the present invention first compares the 4-bit block units and then selects one block thereof which affects the comparison, thereby improving the comparing speed and having the simple logic circuit compared to the conventional adder or subtracter.

It will be apparent to those skilled in the art that various modifications and variations can be made in the comparator of the present invention without departing from the spirit or scope of the invention. Thus, it is intended that the present invention cover the modifications and variations of this invention provided they come within the scope of the appended claims and their equivalents.

What is claimed is:

1. A comparator, comprising;
a plurality of pre-comparing units for comparing two inputs A and B by dividing each of the inputs by 4 bits;
a selection logic unit for receiving an equality signal among signals from the pre-comparing units and outputting a selection enable signal;
a plurality of pass logic units enabled by the selection enable signal of the selection logic unit and outputting outputs of the pre-comparing units and the input A; and
a post-comparing unit for receiving and comparing a 4-bit output of the pre-comparing units which is outputted through the enabled pass logic units and the input A.

2. The comparator according to claim 1, wherein the pre-comparing unit includes:
exclusive OR gates for exclusively ORing the two inputs A and B bit by bit; and
a NOR gate for NORing output signals of the exclusive OR gates and thus outputting an equality signal.

3. The comparator according to claim 1, wherein the pass logic unit includes:
a plurality of transmission gates enabled by the selection enable signal and thus outputting comparing signals which outputted from the pre-comparing units and 4 bits of the input A.

4. The comparator according to claim 1, wherein the post-comparing unit includes:
first and second PMOS transistors having sources for commonly receiving a power source, gates for receiving a comparison signal (/Y3) and an input signal (X3), respectively, and a common drain;
a third PMOS transistor having a source connected to the common drain of the first and second PMOS transistors and a gate for receiving a comparison signal;
fourth, fifth and sixth PMOS transistors serially connected to the drain of the first and second PMOS transistors and having gates for receiving comparison signals (/Y2, /Y1, Y1), respectively;
a seventh PMOS transistor having a source connected to a common connecting point of the fourth and fifth PMOS transistors and a gate for receiving a comparison signal (Y2);
eighth, ninth and tenth PMOS transistors serially connected to the drain of the first and second PMOS transistors and having gates for receiving input signals (X2, X1) and a comparison signal (/Y0), respectively;
an eleventh PMOS transistor having a source connected to a common connecting point of the fifth and sixth PMOS transistors and a common connecting point of the ninth and tenth PMOS transistors and a gate for receiving an input signal (X0);
second to fifth NMOS transistors serially connected to a first NMOS transistor having a gate for receiving the input signal X0 and a source connected to a ground and having gates for receiving comparison signals (/Y0, Y1–Y3), respectively;
a seventh NMOS transistor serially connected to a sixth NMOS transistor having a gate for receiving the input signal (X1) and a source connected to the ground and having a gate for receiving the comparison signal (/Y1) and a drain connected to a common connecting point of the third and fourth NMOS transistors;
a ninth NMOS transistor NM9 serially connected to an eighth NMOS transistor having a gate for receiving the input signal (X2) and a source connected to the ground and having a gate for receiving the comparison signal (/Y2) and a drain connected a common connecting point of the fourth and fifth NMOS transistors; and
an eleventh NMOS transistor serially connected to a tenth NMOS transistor having a gate for receiving the input signal (X3) and a source connected to the ground and having a gate for receiving a comparison signal (/Y3) and a drain commonly connected to a drain of the fifth NMOS transistor and drains of the PMOS transistors, for thereby outputting a final comparison signal.

5. A digital comparator for comparing two M-bit words, comprising:
- a plurality of pre-comparing units, each of which compares two N-bit inputs of the two M-bit words and produces an N-bit output signal and an equality signal;
- a selection logic unit to receive the plurality of equality signals from the plurality of pre-comparing units and to generate selection enable signals;
- a plurality of pass logic units, one of which selectively passes the N-bit output signal from a respective pre-comparing unit and one of the N-bit inputs to the respective pre-comparing unit, based on the selection enable signals; and
- a post-comparing unit to receive and compare the N-bit output signal and the one of the N-bit inputs passed by the pass logic unit, where M and N are both integers and M is greater than N.

6. The digital comparator of claim 5, wherein M is 16 and N is 4.

7. The digital comparator of claim 5, wherein there are an equal number of pre-comparing units and pass logic units.

8. The digital comparator of claim 7, wherein there are 4 pre-comparing units.

9. A digital comparator for comparing two digital words, each digital word composed of sub-words, the comparator comprising:
- a pre-comparing stage to compare a plurality of respective sub-words and to output a plurality of signals indicating equality or non-equality of the compared sub-words;
- a selection unit to receive the plurality of signals from the pre-comparing stage and to generate a plurality of selection signals indicating a most-significant pair of sub-words which are non-equal; and
- a post-comparing stage to determine which of the most-significanlt pair of sub-words is greater and to output a result.

10. The digital comparator of claim 9, wherein the pre-comparing stage compares four sub-words of the digital words.

11. The digital comparator of claim 9, wherein the pre-comparing stage includes:
- a plurality of pre-comparing units, each comparing a pair of respective sub-words and outputting a signal indicating equality or non-equality of the compared sub-words, as well as an output sub-word.

12. The digital comparator of claim 11, wherein the pre-comparing units obtain the output sub-words by performing an exclusive-OR on the pair of respective sub-words input thereto.

13. The digital comparator of claim 11, wherein the post-comparing stage includes:
- a plurality of pass logic units to pass the output sub-word and an input sub-word from a respective pre-comparing unit when enabled by a selection signal of the plurality of selection signals, the output sub-words being the most-significant pair of sub-words; and
- a post-comparing unit to detennine which of the most-significant pair of sub-words is greater.

* * * * *